United States Patent [19]

Auvil et al.

[11] Patent Number: 4,654,063

[45] Date of Patent: * Mar. 31, 1987

[54] PROCESS FOR RECOVERING HYDROGEN FROM A MULTI-COMPONENT GAS STREAM

[75] Inventors: Steven R. Auvil, Macungie; Rakesh Agrawal, Allentown, both of Pa.

[73] Assignee: Air Products and Chemicals, Inc., Allentown, Pa.

[*] Notice: The portion of the term of this patent subsequent to Jun. 17, 2003 has been disclaimed.

[21] Appl. No.: 759,027

[22] Filed: Jul. 25, 1985

Related U.S. Application Data

[63] Continuation-in-part of Ser. No. 684,655, Dec. 21, 1984, Pat. No. 4,595,405.

[51] Int. Cl.⁴ .............................................. F25J 3/02
[52] U.S. Cl. ............................................ 62/18; 55/68; 55/158; 62/19; 62/20; 210/500.21
[58] Field of Search .................. 62/18, 20, 38, 39, 19; 210/500.2; 55/16, 68, 71, 73, 158

[56] References Cited

U.S. PATENT DOCUMENTS

| | | | |
|---|---|---|---|
| 3,359,744 | 12/1967 | Boley et al. | 62/36 |
| 3,864,465 | 2/1975 | Hoffert | 423/648 |
| 3,905,201 | 9/1975 | Coneveny | 62/38 |
| 3,975,170 | 8/1976 | Keating, Jr. | 55/16 |
| 4,152,130 | 4/1979 | Theobald | 62/18 |
| 4,230,463 | 10/1980 | Henis et al. | 210/500.2 |
| 4,242,875 | 1/1981 | Schaefer | 62/23 |
| 4,548,618 | 10/1985 | Linde et al. | 62/18 |

*Primary Examiner*—Frank Sever
*Attorney, Agent, or Firm*—Mark L. Rodgers; E. Eugene Innis; James C. Simmons

[57] ABSTRACT

The present invention involves an efficient process for recovering hydrogen from a gas mixture containing hydrogen and at least one other component. Separation is effected by integrating a semi-permeable membrane based unit with a non-membrane type separation unit.

20 Claims, 4 Drawing Figures

PROCESS FOR RECOVERING HYDROGEN FROM A MULTI-COMPONENT GAS STREAM

CROSS REFERENCE TO PARENT APPLICATION

This is a continuation-in-part of U.S. patent application Ser. No. 684,655, filed Dec. 21, 1984, now U.S. Pat. No. 4,595,405 the subject matter of which is hereby incorporated by reference.

TECHNICAL FIELD

The present invention relates to the recovery of hydrogen from a gas mixture containing hydrogen and at least one other component. More particularly, it involves an energy efficient process to obtain high purity hydrogen at high recovery from gas streams having diverse properties.

BACKGROUND OF THE INVENTION

A wide variety of processes and techniques have been developed to separate and recover hydrogen from a multi-component gas stream.

U.S. Pat. No. 3,359,744 discloses a method for removing hydrocarbons from a crude hydrogen stream wherein a portion of a purified hydrogen stream is mixed with condensed and separated hydrocarbons and the mixture is used to refrigerate and condense the incoming crude hydrogen to obtain increased purity of the product hydrogen. This system also utilizes either product hydrogen or separated hydrocarbons to regenerate and cool a plurality of switching adsorbers which remove water and other impurities prior to condensation of the crude hydrogen stream.

U.S. Pat. No. 3,864,465 disclosed a method of purifying hydrogen off-gas to at least 90% $H_2$ by initially contacting the off-gas with a bed of fluidized iron oxides at temperatures between 160° C. and 310° C. and pressures between 100 psi and 1,000 psi. The $H_2$-containing gas from the fluidized iron oxide bed is then passed through a cryogenic separator to remove impurities, which are mostly methane, to produce a purified hydrogen stream.

U.S. Pat No. 4,242,875 describes a process for the cryogenic purification of industrial by-product gas streams which contain hydrogen in recoverable amounts in which a second, separate feed stream is employed to enhance the refrigeration of the purification system and permit the recovery of an increased amount of hydrogen of the desired purity. Providing a second, separate feed stream allows by-product hydrogen streams to be used which contain non-readily condensable impurities with boiling points below that of methane, such as nitrogen or helium, which are detrimental to a hydrogen product utilized in hydrocracking or hydrotreating processes.

A membrane separation technique is described in U.S. Pat. No. 3,975,170. The method involves passing a fluid mixture whose hydrogen concentration is to be controlled through one chamber of a diffusion cell separated into two chambers by a hydrogen permeable membrane. A gradient of hydrogen partial pressure is then maintained across the membrane at a level sufficient to cause diffusion of hydrogen through the membrane to maintain the concentration of hydrogen in the fluid mixture at a predetermined level. The hydrogen concentration of the fluid may be controlled to some positive value by maintaining a second, fluid-containing hydrogen gas in the other chamber of the diffusion cell, or the hydrogen concentration in the fluid may be controlled to a value approximating zero hydrogen concentration by maintaining a near vacuum in the other chamber of the diffusion cell.

BRIEF SUMMARY OF THE INVENTION

The present invention provides an efficient process for the recovery of hydrogen from a feed gas mixture comprising hydrogen and at least one other component. This process comprises treating the feed gas mixture in a non-membrane separation unit, such as a cryogenic processing unit, and subsequently withdrawing at least a portion of the treated gas stream from said processing unit and introducing said portion into a membrane separation unit. In the membrane separation unit, the gas stream is separated to form a hydrogen-rich stream and a hydrogen-lean stream. The hydrogen-rich stream is collected as usable product. The hydrogen-lean stream is returned to the non-membrane separation unit for further treatment and separation. The non-membrane unit can optionally produce a hydrogen-rich stream which can be combined with the hydrogen-rich stream from the membrane unit to form a combined hydrogen-rich product stream.

If the initial feed gas mixture is sufficiently rich in hydrogen, said feed mixture may initially be passed through a membrane unit to separate out a portion of the hydrogen prior to introducing the feed gas mixture into the non-membrane separation unit.

Incorporating one or more membrane units into a non-membrane processing unit at some point, or points, can improve the efficiency and economics of the system. Specifically, incorporating a membrane separation unit allows a given non-membrane separation unit to be operated efficiently at conditions that might be inefficient when operated on a stand-alone basis. Consequently, separation techniques that were considered inefficient in the past may, when properly coupled with a membrane system, yield superior and feasible processes. This is due in part to the fact that, in the integrated system, use of the membrane provides an additional degree of freedom to adjust the process parameters for further optimization. By proper integration of the membrane and the non-membrane separation units, each of the units operate in their favorable range of operation. In the present process arrangement, both the membrane and the non-membrane separation units complement each others operation to yield a highly efficient process which could not be achieved with separate stand-alone processes. For example, the advantages of the integrated process over typical stand-alone processes may include: significantly higher hydrogen recovery at a given hydrogen purity, a reduction in the size of the equipment needed for the non-membrane separation unit, and a significant power savings in the overall operation of the system.

While the present invention is especially adaptable for separating hydrogen from other components in a hydrogen-containing gas stream, it can be used for any gas stream which contains at least two components which have different permeability through a given membrane. Examples of such applications include separating helium from methane and/or nitrogen; nitrogen from air; oxygen from air; argon from ammonia purge gas; nitrogen from a nitrogen-methane mixture, etc.

DETAILED DESCRIPTION OF THE INVENTION

The present invention provides for an efficient process for recovering hydrogen from a gas stream containing hydrogen and at least one other component, by the integration of one or more membrane units with a suitable non-membrane separation unit. This process can be used for recovering hydrogen from such diverse streams as purge gas from ammonia or methanol synthesis, fluid catalytic cracker (FCC) off-gas, and hydrocracker off-gas. The pressure of these streams may vary from atmospheric to that in excess of 2,000 psia, while the concentration of hydrogen may range from about 10% to 95%. The present invention provides an energy efficient process to obtain high purity hydrogen at a high recovery from these diverse streams.

Figure 1:
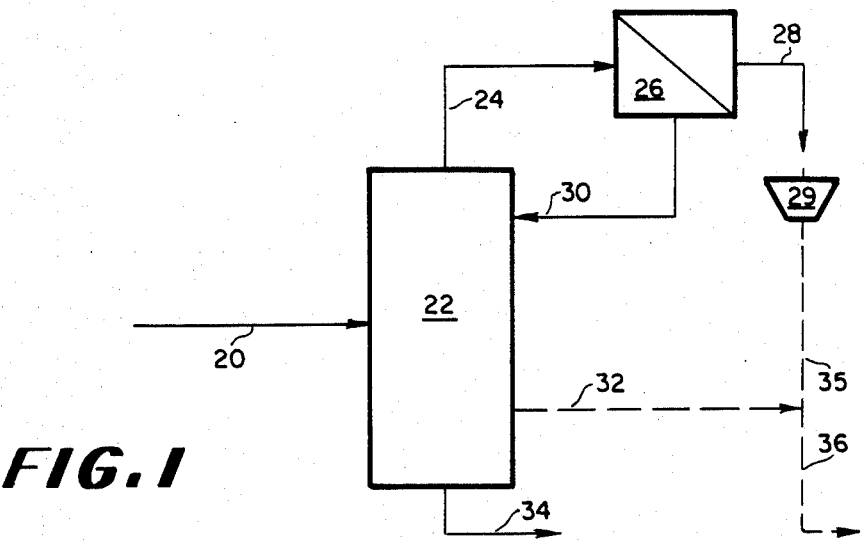
FIG. 1 is a schematic diagram of a process according to the present invention, having one membrane separation unit.

A general description of the process can be had by reference to FIG. 1. A gaseous feed mixture 20, is fed to a suitable non-membrane separation unit 22, for treatment and separation to produce a hydrogen-enriched stream and a hydrogen-depleted stream. The non-membrane separation unit 22 can be an adsorption, absorption, cooling, or partial condensation and/or rectification type unit. At least a portion of the hydrogen-enriched stream is withdrawn from the non-membrane separation unit 22 as gaseous stream 24, and is introduced to a membrane unit 26, wherein said hydrogen-enriched stream is separated to form a hydrogen-rich permeate stream 28 and hydrogen-lean reject stream 30. The hydrogen-lean reject stream 30, is recycled to the non-membrane separation unit 22, for further treatment and separation to produce a hydrogen-depleted stream. The hydrogen-depleted stream separated from the feed stream 20 is combined with the hydrogen-depleted stream separated from the hydrogen-lean stream 30 from the membrane unit 26 and the combined stream is recovered as product stream 34. Product stream 34 comprises mainly the non-hydrogen components contained in the initial feed stream 20. For example, if hydrogen is to be separated from nitrogen and methane, the hydrogen-deficient stream 34 will comprise a stream rich in nitrogen and methane. Optionally, hydrogen-deficient stream 34 may represent more than one stream if the individual components of the hydrogen-deficient stream are also separated in the non-membrane separation unit 22. Any or all of the hydrogen-deficient stream 34 can be recovered as a product stream or simply be discarded as a waste stream. The non-membrane unit 22 can optionally produce a hydrogen-rich stream 32 which can be combined with the hydrogen-rich permeate stream 28 to form a single hydrogen-rich product stream 36. Prior to being combined with hydrogen-rich stream 32, the hydrogen-rich permeate stream 28 is passed through compressor 29 to form stream 35 which is at a pressure about equal to the pressure of the hydrogen-rich stream 32.

Figure 2:
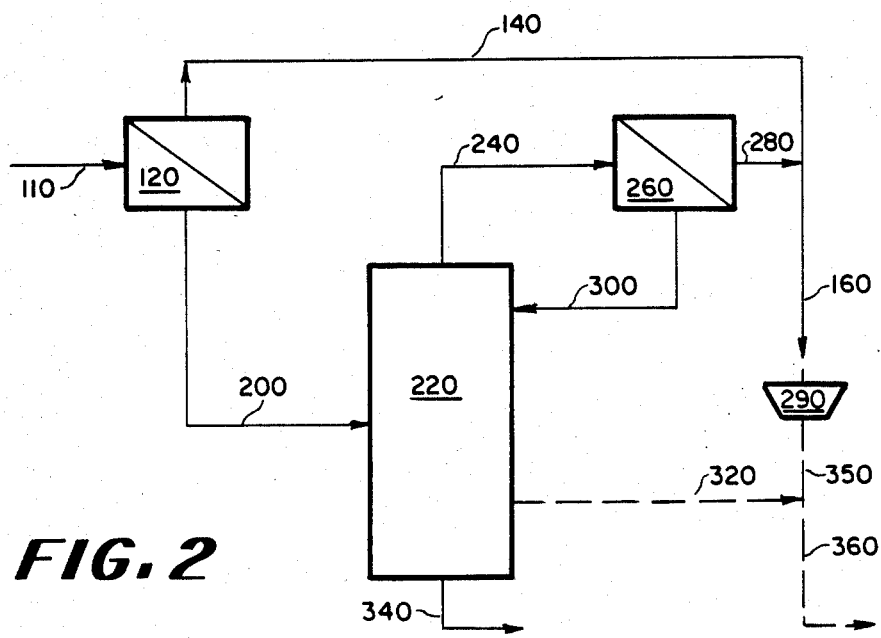
FIG. 2 is a schematic diagram of a process according to the present invention, having two membrane separation units.

In some instances, the gaseous feed mixture may be sufficiently rich in hydrogen; typically at least about 25%; to undergo initial separation in a membrane unit prior to being passed through the non-membrane separation unit. A general representation of such an embodiment is shown in FIG. 2. In this case, a gaseous feed mixture 110 rich in hydrogen is initially passed to a membrane unit 120, where it is separated to form a first hydrogen-rich permeate stream 140 and a reject gas stream 200. The reject gas stream 200, is introduced into a non-membrane separation unit 220, where it undergoes treatment and further separation to produce a hydrogen-enriched stream and a hydrogen-depleted stream. At least a portion of the hydrogen-enriched stream produced in the non-membrane separation unit 220, is withdrawn as stream 240 and introduced into a second membrane unit 260. The second membrane unit 260, separates the hydrogen-enriched stream into a second hydrogen-rich permeate stream 280 and hydrogen-lean reject stream 300. The second hydrogen-rich permeate stream 280 is combined with the first hydrogen-rich permeate stream 140 to form a combined hydrogen-rich stream 160. The hydrogen-lean reject stream 300 is returned to the non-membrane separation unit 220 for further treatment and separation to produce a hydrogen-depleted stream. The non-membrane unit 220 can optionally produce a third hydrogen-rich stream 320. The combined hydrogen-rich stream 160 is compressed to a pressure about equal to that of the third hydrogen-rich stream 320 and the streams are combined to form a final hydrogen product stream 360. The hydrogen-depleted stream separated from the feed 200 to the non-membrane separation unit, is combined with the hydrogen depleted stream separated from the hydrogen-lean reject stream 300 from the second membrane unit 260 and recovered as a product stream 340.

The membrane separation unit used in this invention can be any membrane device with some selectivity for separating hydrogen from the other components in the feed when a pressure differential is maintained across the membrane. Typically, the hydrogen permeability through the membrane is greater than that of the other components present in the feed to the membrane. Consequently, the concentration of hydrogen in the reject stream from the membrane separation unit is less than its concentration in the feed stream entering the membrane. Generally, the pressure in this hydrogen-lean reject stream is within a few psi of the feed stream to the membrane unit and, as shown in FIGS. 1 and 2, is fed to the non-membrane separation unit. A higher permeability of hydrogen and/or its selectivity through the membrane is desirable and results in a beneficial effect on the performance of the overall system. Alternately, the membrane unit may produce a reject stream rich in hydrogen and a permeate stream lean in hydrogen. In such cases, the hydrogen-lean permeate stream would be recycled to the non-membrane separation unit and the hydrogen-rich reject stream would constitute the product.

The membrane separation unit or units may consist of a single membrane device or, alternatively, several membrane devices plumbed and operated so as to achieve the separation in the most efficient manner; e.g. a cascade of membranes with internal recycle streams between various stages of the membrane unit. Typically, the membrane devices are manufactured in modules, each having certain semi-permeable membrane areas for permeation. As a result, the process scheme shown in FIG. 2 which depicts two distinct and separate membrane units, 120 and 260, could alternately employ a single unit having several semi-permeable membrane modules with the various feed streams entering the unit at different locations, depending upon the composition, pressure, etc. For example, if the concentration of hydrogen in the hydrogen-containing stream 240 is less than the gaseous feed mixture 110, the gaseous feed mixture 110 can be fed to the first membrane module, and the hydrogen-containing stream 240 can be mixed with the reject stream from either the first module or any suitable subsequent module to provide a mixed feed to the next module. The reject stream with which the hydrogen-containing stream 240 is mixed is chosen such that the hydrogen concentration of both streams is approximately equal. The reject from the final module forms the feed to the non-membrane unit 220. Alternatively, if the concentration of the hydrogen in hydrogen-containing stream 240 is higher than the gaseous feed mixture 110, it is fed to the first membrane module, and the gaseous feed mixture 110 is mixed with the reject stream from a suitable intermediate module to form a combined feed to the next module.

Other variations of the process scheme depicted in FIG. 2 are possible depending upon the concentrations of the various streams. For example, if the concentration of hydrogen in the hydrogen-containing stream 240 is less than the gaseous feed mixture 110, the gaseous feed mixture 110 is fed to the membrane unit 120 and a separation is achieved such that the concentration of hydrogen in the reject stream 200 is approximately equal to its concentration in stream 240. The two streams, 200 and 240, are then mixed to form a combined feed to membrane unit 260. The reject stream 300 from this unit forms the feed to the non-membrane unit 220. Alternatively, if the concentration of hydrogen in the hydrogen-containing stream 240 is higher than the gaseous feed mixture 110, the reject stream 300 from the membrane unit 260 is mixed with gaseous feed mixture 110 and the combined stream is fed to the membrane unit 120. The reject stream 200 from the membrane unit 120 then forms the feed to the non-membrane unit 220.

In both of the above process schemes, optional compressors or expanders may be utilized to vary the pressure of any of the gas streams, depending upon the gas mixture, treatment pressures, and pressure difference between any two streams which are subsequently combined. For example, in FIG. 1, stream 24 from the non-membrane separation unit 22 can be pressurized prior to being fed to the membrane separation unit 26. Additionally, vacuum pumps may be used to achieve sub-atmospheric pressure on the permeate side of one or more of the membranes in order to increase diffusion rates of the desired gas across the membrane.

It should be understood that any required pretreatment of the gaseous feed mixture to the integrated process, or post-treatment of any of the product streams from the integrated process can be employed with this invention. For example, depending upon the choice of the non-membrane process, a pretreatment to remove certain components from the gaseous feed mixture which can have adverse effect on the operation of the integrated process may be required. Similarly, it is possible to have components in the final hydrogen product which may be undesirable in the subsequent use of this product stream and must be removed in a post-treatment operation prior to its use.

Although both FIGS. 1 and 2 show only one stream, 24 and 240 respectively, leaving the non-membrane separation units and serving as a feed to a single membrane separation unit, in practice one or more streams can be taken from the non-membrane unit and fed to one or more membrane units. The number of streams taken from the non-membrane separation unit, as well as the composition, pressure, and temperature of the streams is dependent upon the type of non-membrane separation unit used, and is adjusted so that the performance of the total plant is at its most optimal point.

Since only a marginal pressure drop is experienced between the feed stream to the membrane unit and the reject stream leaving the membrane unit, the feed to the non-membrane unit remains at a fairly high pressure. Additionally, all of the high purity product does not have to be produced from the non-membrane unit which allows the unit to be run under optimum conditions. For example, if the non-membrane separation unit is a cryogenic unit, the partial pressures of the condensibles in the feed to the cryogenic unit are kept at high values so that a significant fraction of these can be condensed at much warmer temperatures. Therefore, if the concentration of these condensibles in the feed to the integrated plant is low, it is first fed to a membrane unit to produce a reject stream which is lean in hydrogen, but has higher partial pressures of condensibles. The reject stream having a high condensibles partial pressure is then fed to the cryogenic unit. Moreover, all the feed to the cryogenic unit is not cooled to very low temperatures to produce a product of high purity, but a significant fraction, or all of it, is cooled sufficiently to give a gaseous stream with a relatively higher concentration of undesired components. This stream is then sent to another membrane unit to give a permeate product stream. By avoiding extremely low temperatures in the cryogenic unit, the demand for refrigeration is decreased and it operates at its optimum. The reject stream from the membrane which again has higher partial pressures of the condensibles is recycled back to the cryogenic unit for further processing.

A wide range of process conditions, including temperatures, pressures, flow rates, etc., can be employed in the present integrated non-membrane/membrane process, to achieve optimum results, depending upon the equipment used and the desired type and concentration of product. The examples below illustrate several of these various process schemes. These examples are meant only to be illustrative and are not meant to limit the scope of the invention.

EXAMPLE 1

Several runs were made to produce a 96.5% pure hydrogen stream at about 500 psia from a gaseous feed mixture containing 25% hydrogen at about 280 psia. The concentration of hydrogen is typical of those found in fluid catalytic cracking off-gas streams, for which the present process is particularly adaptable. In this example, the non-membrane separation unit was a suitable cryogenic separation unit. The feed gas properties for all of the runs in this example are set out in Table 1 below.

TABLE 1

Feed Gas Properties for Example 1
Feed Rate = 4250 lb moles/hr
Pressure = 280.0 psia
Temperature = 38° C.
Composition:

| Component | Mole % |
|---|---|
| Hydrogen | 25.0 |
| Nitrogen | 5.0 |
| Methane | 33.0 |
| Ethane | 27.0 |
| Propane | 6.5 |
| Butane | 2.0 |
| Pentane | 1.0 |
| Hydrogen Sulfide | 0.5 |

Figure 3:
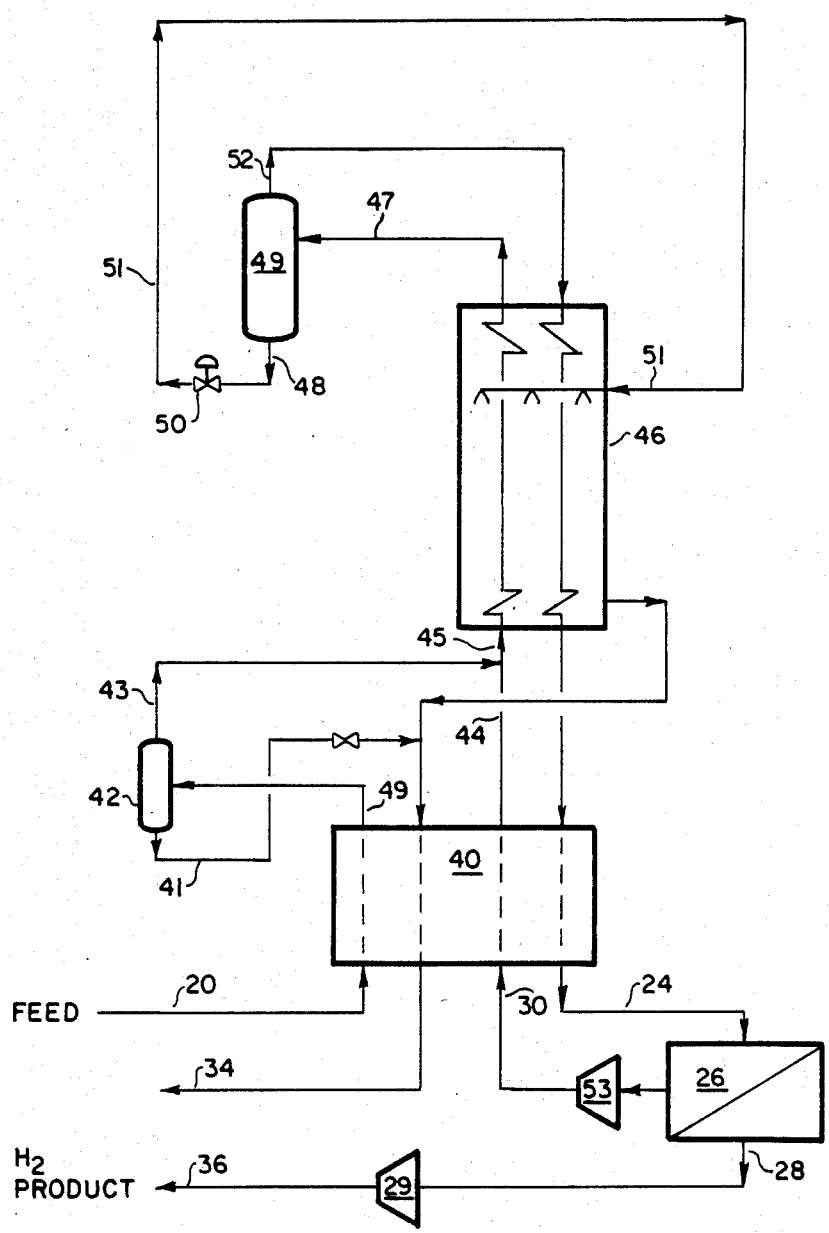
FIG. 3 is a flow diagram of one embodiment of the present invention having one membrane separation unit.

Run 1:

A hybrid cryogenic/membrane process based on the concept of FIG. 1 was carried out and is shown in detail in FIG. 3. Corresponding gas streams and equipment from FIG. 1 and FIG. 3 are numbered the same. The feed stream 20, is cooled to a temperature of about −45° C. in heat exchanger 40 to form stream 49 containing gaseous components and condensed propane and heavier hydrocarbons. The condensed portion of stream 49, is separated as stream 41 in separator 42. The non-condensed portion, stream 43, is mixed with the cooled reject stream 44 from the membrane unit 26, to form combined stream 45. The combined stream 45 is further cooled to a temperature of about −170° C. in heat exchanger 46, to yield a partially condensed stream 47. The condensed portion of this stream is separated as stream 48 in separator 49 and expanded across a valve 50, to a low pressure of about 21 psia, to provide cooling for heat exchanger 46. The non-condensed portion, stream 52, has 83% hydrogen, 14.5% nitrogen, 2.5% methane, and the other components are present only in trace quantities. The non-condensed stream 52 is passed through exchangers 46 and 40, to yield stream 24, which is fed to a semiipermeable membrane unit 26. Hydrogen has a much higher permeability through the membrane, relative to the other components contained in stream 40. By maintaining a pressure difference across the membrane, permeate stream 28, with the hydrogen concentration of about 96.5% at 100 psi pressure, is collected from the membrane unit 26. The non-permeate or reject stream, from the membrane unit 26, which is close in pressure to that of feed stream 24, is boosted in pressure by compressor 53, to provide compressed stream 30 at about 272 psia. Stream 30 is rich in nitrogen and is recycled back to heat exchanger 40. Alternatively, stream 24 could be boosted in pressure, and stream 30 could be recycled without any compression. The permeate stream 28, from the membrane unit 26, is further compressed by compressor 29 to give a final hydrogen product stream 36, at about 500 psia. The separated propane and heavier hydrocarbons are combined and collected as a product or waste stream 34. The details of the key process streams for this integrated cryogenic/membrane process are given in Table 2 below.

TABLE 2

Key Process Streams for Hybrid Cryogenic/Membrane Process of FIG. 3 for Example 1

| Stream Number | 20 | 43 | 48 | 52 | 24 | 30 | 28 | 34 |
|---|---|---|---|---|---|---|---|---|
| Pressure (psia) | 280 | 270 | 260 | 260 | 255 | 272 | 100 | 16 |
| Temperature (°C.) | 38 | −45 | −170 | −170 | 30 | 38 | 30 | 30 |
| Total Flow (lb mole/hr) | 4250 | 3399 | 2315 | 1395 | 1395 | 311 | 1084 | 3166 |
| Composition (mole %) | | | | | | | | |
| Hydrogen | 25.0 | 31.1 | 0.6 | 83.0 | 83.0 | 36.3 | 96.5 | 0.5 |
| Nitrogen | 5.0 | 6.2 | 7.8 | 14.5 | 14.5 | 55.2 | 2.8 | 5.8 |
| Methane | 33.0 | 39.2 | 57.2 | 2.5 | 2.5 | 8.5 | 0.7 | 44.1 |
| Ethane | 27.0 | 21.0 | 30.8 | — | — | — | — | 36.2 |
| Propane | 6.5 | 1.9 | 2.8 | — | — | — | — | 8.7 |
| Butane | 2.0 | 0.2 | 0.2 | — | — | — | — | 2.7 |
| Pentane | 1.0 | 0.0 | 0.0 | — | — | — | — | 1.3 |
| Hydrogen Sulfide | 0.5 | 0.4 | 0.6 | — | — | — | — | 0.7 |

Run 2:

The same type of stream as treated in Run 1 was treated in a stand-alone cryogenic unit, to provide the desired 96.5% pure hydrogen stream at 500 psia from the same type of feed as treated above. As can be seen in Table 3 below, in order to achieve the hydrogen product purity desired, this stand-alone unit recovers only about 30.7% of the hydrogen in the feed as compared to about 98.4% for Run 1.

Run 3:

A second stand-alone cryogenic process was carried out with conditions altered so that hydrogen recovery was similar to that in Run 1 at the same hydrogen purity. A comparison of the power required to achieve these results for the stand-alone cryogenic process as compared to Run 1, as can be seen in Table 3 below, is substantially greater than the power required for the integrated cryogenic/membrane hybrid system.

Run 4:

A stand-alone membrane system was used to produce the desired purity hydrogen product as set out above. Since the maximum concentration of hydrogen in the permeate stream from a single stage membrane unit is about 89%, it was decided to use a two stage membrane cascade system with internal recycle. As can be seen in Table 3 below, the results achieved from this system is only 61.6% hydrogen recovery at a power requirement of about 2.4 times that of Run 1, which recover a significantly higher percentage of hydrogen.

TABLE 3

Hydrogen Recovery and Power Consumption for All the Runs of Example 1
Final Product Pressure = 500 psia

| Run | 1 | 2 | 3 | 4 |
|---|---|---|---|---|
| H₂ Recovery (%) | 98.4 | 30.7 | 98.9 | 61.6 |
| Power (KW): | | | | |
| Membrane Reject Booster | 15 | — | — | 1161 |
| Low Pressure Product Compressor | — | — | 1276 | 847 |
| Medium Pressure Product Compressor | 840 | 110 | 110 | — |
| Total (KW) | 855 | 110 | 1386 | 2008 |

EXAMPLE 2

Runs were made to produce a 97.3 mole% hydrogen stream at about 2,000 psia from a feed stream containing 86.9 mole % hydrogen at 2,000 psia. The hydrogen concentration of the feed is typical of a hydrocracker off-gas. As in Example 1, the non-membrane unit was a suitable cryogenic separation unit. The hydrogen partial pressure of the feed stream was sufficiently high to allow the feed to be passed directly to an initial membrane unit for partial hydrogen separation. The feed gas properties for all the runs in this example are set out in Table 4 below.

TABLE 4

Feed Stock Properties for Example 2
Feed Rate = 2183 lb moles/hr
Pressure = 2000 psia
Temperature = 65.5° C.
Composition:

| Component | Mole % |
| --- | --- |
| Hydrogen | 86.9 |
| Methane | 10.0 |
| Ethane | 0.4 |
| Propane | 0.9 |
| n-Butane | 1.4 |
| n-Pentane | 0.3 |
| Hydrogen Sulfide | 0.1 |

Figure 4:
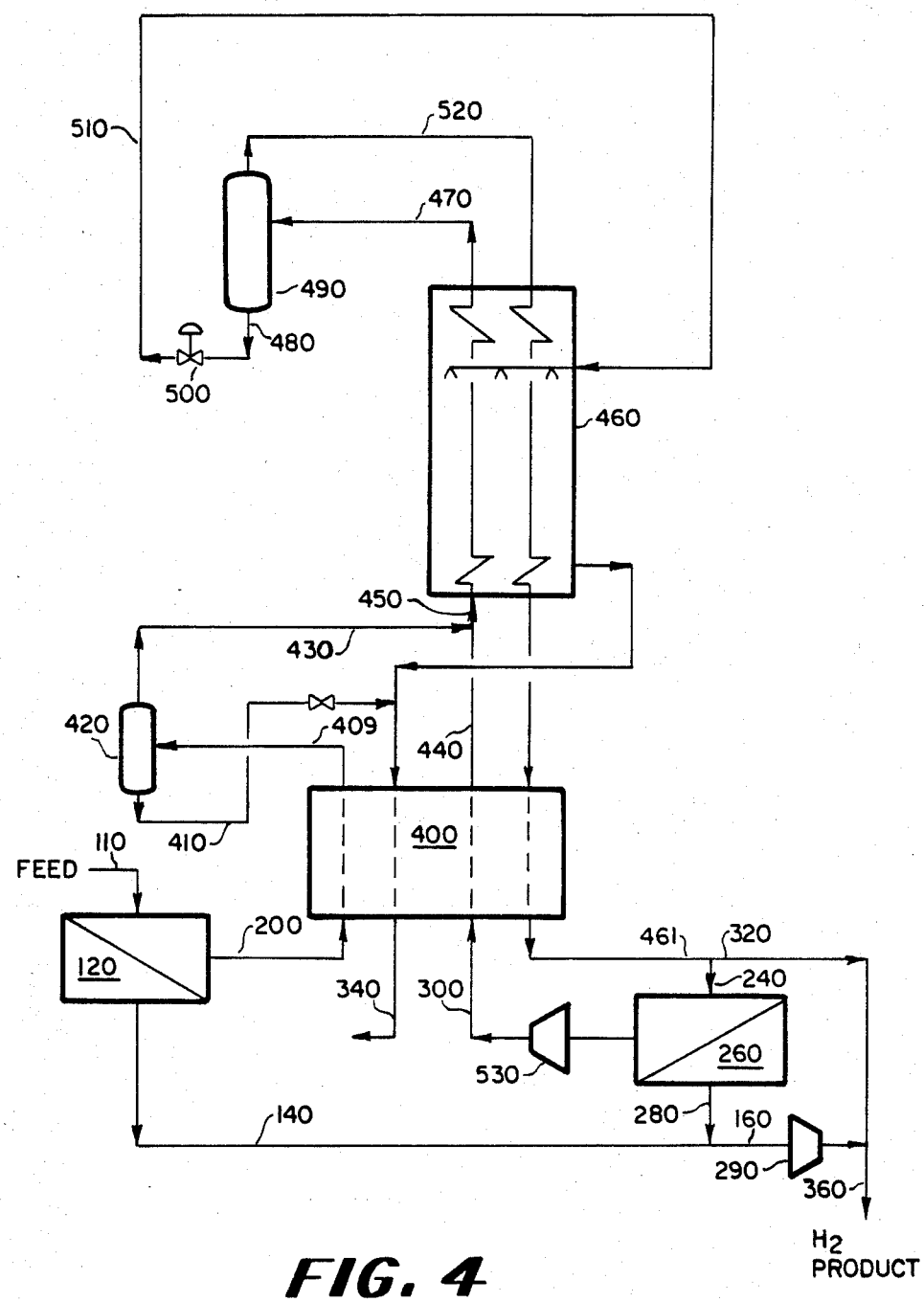
FIG. 4 is a flow diagram of one embodiment of the present invention having two membrane separation units.

Run 1:

A hybrid cryogenic/membrane process based on the concept of FIG. 2 was carried out and is shown in detail in FIG. 4. Corresponding gas streams and equipment from FIG. 2 and FIG. 4 are numbered the same. The feed stream 110 is fed to an initial membrane separation unit 120 to form a permeate stream 140 and a reject stream 200. The permeate stream comprises about 98 mole % hydrogen and is collected as product. The reject stream 200 from the membrane unit 120 is cooled to a temperature of about 10° C. in heat exchanger 400 to form stream 409 containing gaseous components and condensed propane and heavier hydrocarbons. The condensed portion of stream 409 is separated as stream 410 in separator 420. The non-condensed portion, stream 430, is mixed with the cooled reject stream 440 from membrane unit 260 to form combined stream 450. Combined stream 450 is cooled in heat exchanger 460 to form a partially condensed stream 470 at a temperature of about −148° C. The condensed portion, comprising mostly propane and heavier hydrocarbons, of stream 470 is separated in separator 490 as stream 480 and expanded across a valve 500 to yield stream 510 at a pressure of about 21 psia which provides cooling for heat exchanger 460. The non-condensed portion of stream 470, separated as stream 520, contains about 93.0 mole % hydrogen and about 7.0 mole % methane, with other components present only in trace quantities. Stream 520 is then passed through heat exchangers 460 and 400, to yield stream 461. A portion of stream 461 is collected as hydrogen-rich product stream 320 while the remainder of stream 461 is fed to a semi-permeable membrane unit 260 as stream 240. Hydrogen has a much higher permeability through the membrane relative to the other components contained in stream 240. By maintaining a pressure difference across the membrane 260, permeate stream 280 with a hydrogen concentration of about 98.2% at 1,300 psia is collected from the membrane unit 260. Permeate stream 280 is combined with permeate stream 140 to form combined stream 160 which is compressed to about 1,925 psia in compressor 290, after which it is combined with stream 320 to form a hydrogen product stream 360. The non-permeate or reject stream is pressurized to about 1,945 psia in compressor 530 to form stream 300 and recycled back to heat exchangers 400 and 460. The separated propane and heavier hydrocarbons are recovered as a waste or product stream 340. The details of the key process streams for this integrated cryogenic/membrane process are given in Table 5 below.

TABLE 5

Key Process Steams for Hybrid Cryogenic-Membrane Process of FIG. 4 for Example 2, Run 1

| Steam Number | 110 | 140 | 200 | 430 | 480 | 520 | 320 | 240 | 300 | 280 |
| --- | --- | --- | --- | --- | --- | --- | --- | --- | --- | --- |
| Pressure (psia) | 2000 | 1300 | 1950 | 1940 | 1930 | 1930 | 1925 | 1925 | 1945 | 1300 |
| Temperature (°C.) | 65.5 | 65.5 | 65.5 | 10.0 | −148.3 | −148.3 | 56.1 | 62.8 | 62.8 | 62.8 |
| Total Flow (lb mole/hr) | 2183 | 1241 | 942 | 913 | 227 | 765 | 285 | 480 | 79 | 401 |
| Composition (mole %) | | | | | | | | | | |
| Hydrogen | 86.9 | 98.0 | 72.3 | 74.3 | 8.7 | 93.0 | 93.0 | 93.0 | 66.4 | 98.2 |
| Methane | 10.0 | 1.6 | 21.0 | 21.3 | 73.6 | 7.0 | 7.0 | 7.0 | 33.6 | 1.8 |
| Ethane | 0.4 | 0.1 | 0.9 | 0.8 | 3.3 | 0.0 | 0.0 | 0.0 | 0.0 | 0.0 |
| Propane | 0.9 | 0.1 | 2.0 | 1.6 | 6.3 | 0.0 | 0.0 | 0.0 | 0.0 | 0.0 |
| n-Butane | 1.4 | 0.1 | 3.0 | 1.7 | 6.8 | 0.0 | 0.0 | 0.0 | 0.0 | 0.0 |
| n-Pentane | 0.3 | 0.0 | 0.7 | 0.2 | 0.8 | 0.0 | 0.0 | 0.0 | 0.0 | 0.0 |
| $H_2$ | 0.1 | 0.1 | 0.1 | 0.1 | 0.5 | 0.0 | 0.0 | 0.0 | 0.0 | 0.0 |

Run 2:

A second run was carried out similar to Run 1 above, with the process cycle being similar to the one shown in FIG. 4 with the difference being that membrane unit 260 is not used at the back end; and therefore no recycle stream 300 is used. Stream 461 from the cryogenic unit has the needed hydrogen concentration and is mixed with permeate stream 140 from the membrane unit 120 to give the total product stream. In order to get a 97.3% hydrogen product stream, a portion of stream 520 from separator 490 must be expanded across a valve to provide the required cooling in heat exchanger 460.

A comparison of hydrogen recovery and power consumption for Example 2, Runs 1 and 2 are given in Table 6 below.

TABLE 6

Hydrogen Recovery and Power Consumption to Provide 97.3% Hydrogen at 2000 psia for Example 2

| Run | 1 | 2 |
| --- | --- | --- |
| $H_2$ Recovery (%) | 98.9 | 98.2 |
| Power (KW): | | |
| Membrane 260 Reject Stream Compression | 1 | — |
| Permeate Compression | 307 | 362 |

TABLE 6-continued

Hydrogen Recovery and Power Consumption to
Provide 97.3% Hydrogen at 2000 psia for
Example 2

| Run | 1 | 2 |
|---|---|---|
| Final Product Compression | 38 | 38 |
| TOTAL (KW) | 346 | 400 |

It can be seen from Table 6 above that the single, initial membrane process, Run 2, consumes about 16% more power to recover a similar amount of hydrogen than the process of the present invention; Run 1.

The above examples clearly demonstrate that the present invention provides for high recovery of high purity hydrogen utilizing less energy than prior processes.

Having thus described the present invention, what is now deemed appropriate for Letters Patent is set out in the following appended claims.

What is claimed is:

1. A process for removing hydrogen from a feed gas mixture comprising hydrogen and at least one other component, said process comprising providing an additional degree of freedom for adjusting the process parameters by:
   (a) treating said feed gas mixture in a non-membrane separation unit to produce a hydrogen-enriched stream and a hydrogen-depleted stream;
   (b) withdrawing at last a portion of the hydrogen-enriched stream from the non-membrane separation unit;
   (c) feeding said portion of said hydrogen-enriched stream to a membrane separation unit, wherein said hydrogen-enriched stream is separated to form a hydrogen-rich stream and a hydrogen-lean stream;
   (d) recycling the hydrogen-lean stream to the non-membrane separation unit for further treatment and separation to produce a hydrogen-depleted stream; and
   (e) recovering the hydrogen-rich stream from the membrane separation unit.

2. The process in accordance with claim 1 wherein the hydrogen-depleted stream produced in step (a) is combined with the hydrogen-depleted stream produced in step (d) and subsequently recovered as product.

3. The process in accordance with claim 1 wherein the hydrogen-rich stream from the membrane unit is the permeate stream from the membrane and the hydrogen-lean stream is the reject stream.

4. The process in accordance with claim 1 wherein a hydrogen-rich stream is produced in the non-membrane separation unit and is combined with the hydrogen-rich stream from the membrane unit to form a combined hydrogen product stream.

5. The process in accordance with claim 1, wherein said non-membrane separation unit is a cryogenic-type separation unit.

6. The process in accordance with claim 1 wherein the hydrogen-lean stream from the membrane unit is passed through a compressor prior to being returned to the non-membrane separation unit.

7. The process in accordance with claim 1 wherein the membrane separation unit comprises a cascade of membranes with internal recycle streams between various stages of the membrane unit.

8. The process in accordance with claim 1 wherein the hydrogen-rich stream from the membrane unit is passed through a compressor prior to being combined with the second hydrogen-rich stream.

9. The process in accordance with claim 1 wherein the feed gas mixture comprises hydrogen, nitrogen, hydrogen sulfide, methane and heavier hydrocarbons.

10. The process in accordance with claim 1 wherein the feed gas mixture is passed through a membrane separation unit to remove a portion of the hydrogen prior to being treated in the non-membrane separation unit.

11. A process for recovering hydrogen from a feed gas mixture comprising hydrogen and at least one other component, said process comprising providing an additional degree of freedom for adjusting the process parameters by:
   (a) passing said feed gas mixture through a first membrane separation unit to form a first hydrogen-rich stream and a first hydrogen-lean stream;
   (b) treating said hydrogen-lean stream in a non-membrane separation unit to produce a hydrogen-enriched stream and a hydrogen-depleted stream;
   (c) withdrawing at least a portion of the hydrogen-enriched stream from the non-membrane separation unit;
   (d) feeding said portion of said hydrogen-enriched stream to a second membrane unit wherein said hydrogen-enriched stream is separated to form a second hydrogen-rich stream and a second hydrogen-lean stream;
   (e) recycling the second hydrogen-lean stream to the non-membrane separation unit for further treatment and separation to produce a hydrogen-depleted stream; and
   (f) recovering both hydrogen-rich streams.

12. The process in accordance with claim 11 wherein the hydrogen-depleted stream produced in step (b) is combined with the hydrogen-depleted stream produced in step (e) and subsequently recovered as product.

13. The process in accordance with claim 11 wherein said non-membrane separation unit is a cryogenic-type separation unit.

14. The process in accordance with claim 13 wherein a third hydrogen-rich stream is produced in the non-membrane separation unit and is combined with both of the hydrogen-rich streams from the membrane separator units to form a combined hydrogen product stream.

15. The process in accordance with claim 14 wherein the first and second hydrogen-rich streams are combined and passed through a compressor prior to being combined with the third hydrogen-rich stream.

16. The process in accordance with claim 15 wherein the feed gas mixture comprises hydrogen, hydrogen sulfide, methane and heavier hydrocarbons.

17. The process in accordance with claim 16 wherein vacuum pumps are used to achieve sub-atmospheric pressure on the permeate side of the membrane units.

18. The process in accordance with claim 17 wherein the first and second membrane units are part of a single membrane separation unit with the feed gas and the portion of the treated gas stream from the non-membrane separation entering the single membrane unit at different locations along the unit.

19. The process in accordance with claim 18 wherein the single membrane separation unit comprises a cascade of membranes with internal recycles.

20. The process in accordance with claim 11 wherein the hydrogen-rich streams from the membrane units are permeate streams and the hydrogen-lean streams are reject streams.

* * * * *